United States Patent [19]
Zindler

[11] 3,735,902
[45] May 29, 1973

[54] DISPENSER APPARATUS

[75] Inventor: Jerrold Zindler, Cambridge, Mass.

[73] Assignee: Instrumentation Laboratory, Inc., Lexington, Mass.

[22] Filed: July 22, 1971

[21] Appl. No.: 164,995

[52] U.S. Cl. ................. 222/363, 73/423 A, 73/425.6
[51] Int. Cl. ............................................. A61b 10/00
[58] Field of Search ..................... 222/309, 361–363, 222/476; 73/423 A, 425.6

[56] References Cited

UNITED STATES PATENTS

| | | | |
|---|---|---|---|
| 3,607,094 | 9/1971 | Beer | 73/425.6 X |
| 3,550,453 | 12/1970 | Lightner et al. | 73/423 A X |
| 3,546,946 | 12/1970 | Smith | 73/423 A |
| 3,622,047 | 11/1971 | Oberli | 73/423 A X |
| 3,656,473 | 4/1972 | Sodickson et al. | 73/423 A X |

Primary Examiner—Lloyd L. King
Assistant Examiner—Michael Mar
Attorney—Willis M. Ertman

[57] ABSTRACT

A dispenser apparatus comprises a housing that includes a chamber for holding a sample. A member in the housing is moved relative to the chamber from a first position to a second position to aspirate material into the chamber and is moved from the second position to the first position to dispense material from the chamber. Pressure in the chamber is increased at the end of the dispensing movement to discharge all of the material from the chamber.

9 Claims, 8 Drawing Figures

PATENTED MAY 29 1973

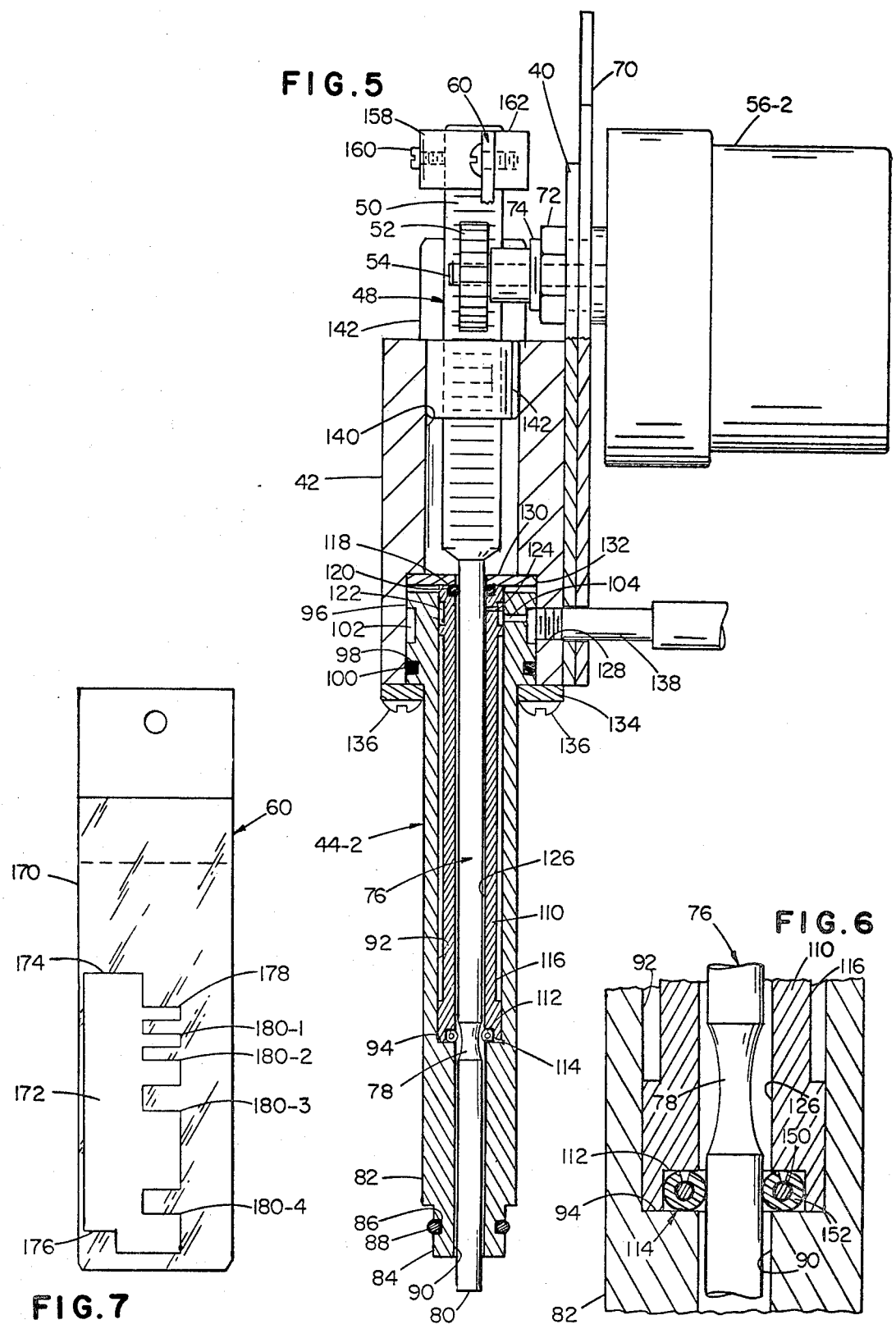

DISPENSER APPARATUS

SUMMARY OF INVENTION

This invention relates to dispenser systems and more particularly for systems particularly adapted for dispensing minute quantities of materials in accurate amounts.

It is frequently necessary to provide a precise amount of a known or unknown material for use in connection with a chemical analysis. In photometric analyses, for example, measurements may be made directly, by comparison with a standard, or as a function of the rate of chemical change. Such techniques are frequently employed in the analysis of precious fluids such as blood or other body fluids. For example, a chemical analysis of a sample of such a fluid for enzymes, hemoglobin, chloresterol, glucose, etc., provides useful diagnostic information. While laboratory services performing such analyses are available, the use of such services often entails the delay of several days or more before analysis information is available. Accordingly a need exists in this field for instrumentation that provides accurate chemical analysis data and that can be operated by untrained personnel. Such instrumentation would assist laboratories in contending with the shortage of skilled personnel. As an adjunct to the performance of such analyses, however, it is necessary to provide a system for measuring out quantities of particular materials to be employed in the chemical analysis in precise amounts, and it is an object of this invention to provide novel and improved apparatus for this purpose.

Another object of the invention is to provide novel and improved apparatus and systems for the accurate dispensing of different and minute amounts of materials.

Another object of the invention is to provide novel and improved dispensing systems which are easy to operate and which a variety of different amounts may be easily selected by an untrained operator.

In accordance with the invention there is provided dispenser apparatus comprising a housing that includes a chamber for holding a sample, the chamber having a port through which the sample material is dispensed. A member, coupled to the housing, is movable relative to the chamber from a first position to a second position to aspirate material into the chamber through the port and on further movement, to dispense material from the chamber through the port. The apparatus further includes means to increase the pressure in the chamber to supplement the dispensing action produced by the further movement of the member.

In particular embodiments, the housing has a bore, the movable member is mounted in the bore for reciprocating movement, and rack and pinion gearing is employed to reciprocate the member. The pressure increasing means in such embodiments includes a blower, a passage between the blower and the chamber and valve means responsive to movement of the member to control the flow through the passage. In a preferred embodiment, the valve means comprises a seal member mounted in the housing and a cooperating bypass portion on the member so that movement of the member to a predetermined position positions the bypass portion in bridging relation to the seal member so that the passage between the blower and the chamber is open. Also, the chamber, in preferred embodiments, is defined by a replaceable member that is conical in configuration, the port being formed at the conical tip of the member and the member being releasably secured to the housing at its end opposite the port.

A preferred embodiment of the invention is employed in photometric analysis instrumentation for performing chemical analyses on precious fluids such as blood to provide medically useful diagnostic information, and is designed to dispense material in quantities of 25, 50, 100, or 200 microliters to an accuracy of ±1 percent under the control of a card reader, with a card containing data correlated with material to be dispensed into a container for use in a photometric analysis of the resulting mixture of materials.

Other objects, features and advantages of the invention will be seen as the following description of a particular embodiment progresses, in conjunction with the drawings, in which:

FIG. 5 is a sectional view of the dispensing apparatus taken along the line 5—5 of FIG. 4;

FIG. 6 is an enlarged view of a portion of the dispensing apparatus showing details of the valve means included therein;

FIG. 7 is an enlarged view of flag structure employed in the dispensing apparatus.

DESCRIPTION OF PARTICULAR EMBODIMENT

Figure 1:
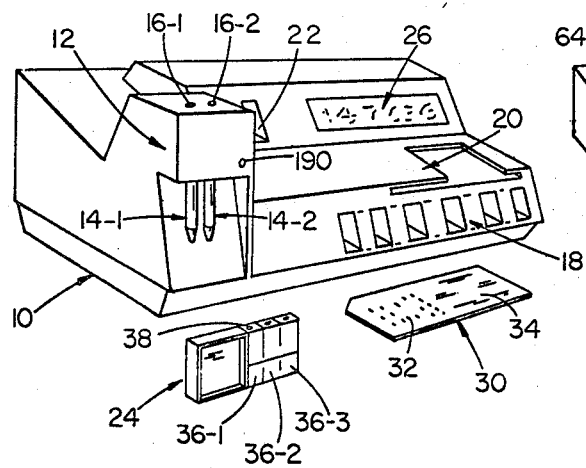
FIG. 1 is a perspective view of components of a biochemical analysis system incorporating apparatus constructed in accordance with the invention.

With reference to FIG. 1, there is shown a biochemical analysis instrument that includes a housing 10 on which is mounted a dispenser unit 12 that has two dispensing sections 14-1 and 14-2 and corresponding dispenser control switches 16-1 and 16-2. To the right of the dispenser unit 12 is an incubator section 18 and above section 18 is a card receiving slot of card reader unit 20. Above and to the rear of the card reader unit 20 is a photo-meter section that includes a port 22 for receiving a cuvette assembly 24 and a digital photometer output display 26. Used with this instrument is the cuvette assembly 24 and a card 30 that includes a data section 32, having photometer calibrating and control information and dispenser control information correlated with material in that cuvette assembly, and an instruction section 34.

The cuvette assembly 24 includes three sample chambers 36-1, 36-2 and 36-3 of five milliliters volume each. Each chamber has two spaced side walls with parallel optical windows therein and is constructed of high quality optical material, the material employed in a preferred embodiment being a transparent TPX methyl pentane polyolefin plastic. A port 38 in the upper wall of each chamber is sealed by a frangible section which may be broken away to permit introduction of material into the corresponding sample chamber 36.

Figure 2:
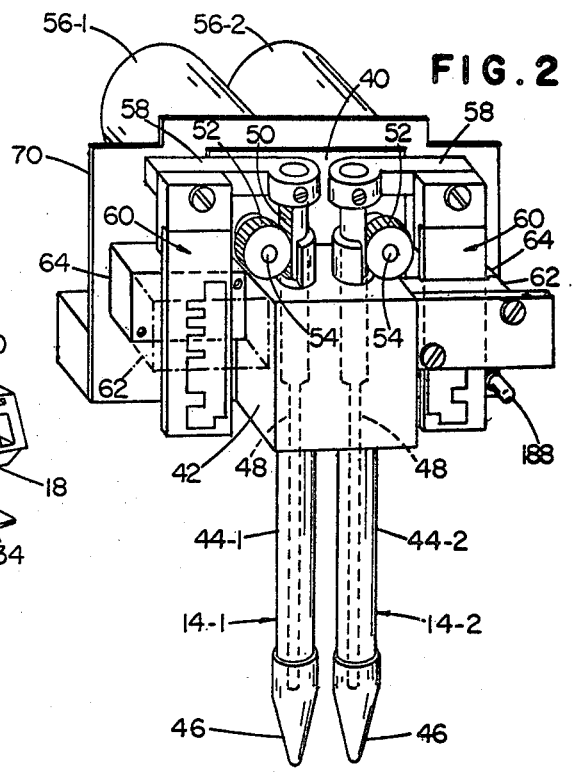
FIG. 2 is a perspective view, with components removed, of dispensing apparatus employed in the system shown in FIG. 1.

Additional details of the dispenser may be seen with reference to FIG. 2 which shows components of the dispenser as exposed when the cover is removed. The dispenser includes a support plate 40 on which is disposed a support body 42. Depending from body 42 are tubular housing members 44-1, 44-2 each of which has a replaceable conical chamber member 46 secured at its lower end. Disposed for reciprocating movement within each member 44 is a shaft 48 which at its upper end has formed on it a rack gear portion 50 that is engaged by pinion gear 52. Gear 52 is in turn mounted on a shaft 54 driven by reversible motor 56. Secured at the top of each shaft 48 is a laterally extending arm 58 which carries a depending flag or index member 60. That index member is disposed in a slot defined between a front member 62 that houses two light sources and a rear member 64 that houses three light sensors. Signals produced by the sensors as a function of movement of the flag or index member 60 are employed to control the operation of the dispenser apparatus.

Additional details of the dispenser apparatus may be seen with reference to FIGS. 3–7. As shown in those figures, the apparatus includes support plate 40 and a printed circuit board 70 which carries circuit components for the control of the dispenser apparatus. Board 70 is clamped to support plate 40 by suitable fastenings including nut 72 which engages housing 74 of motor shaft 54. Pinion gear 52 is mounted on shaft 54 and engages rack gear 50. As best seen with reference to FIG. 5, movable shaft member 48 is a cylinder, one-eighth inch in diameter in this embodiment. A toroidal groove 78, 0.020 inch in maximum depth and 0.125 inch in length is formed in cylindrical portion 76 adjacent tip 80.

The cylindrical portion 76 is mounted within housing assembly 44 which includes an outer member 82 having an end portion 84 of reduced diameter with a groove 86 in it in which an O-ring 88 is secured. A bore 90 is formed in the lower portion of member 82 and a second bore 92 of larger diameter is formed in the upper portion, the transition between the two bores being defined by shoulder 94. Member 82 has an enlarged head portion 96 in the outer surface of which is formed annular groove 98 in which is disposed a sealing O-ring 100 and annular manifold groove 102 which has a radial passage 104 communicating therewith.

Insert member 110 is disposed within bore 92 and includes an internal groove 112 at its lower end in which a seal member 114 is disposed, an annular recess 116 in its outer surface that extends its length, an internal groove 118 at its upper end which receives seal ring 120, an annular manifold groove 122 and a radial passage 124 that communicates with groove 122. The inner bore 126 of member 110 is of the same diameter as bore 90. A retaining plate 130 is seated in shoulder 132 formed in the interior of support member 42 and the assembly of members 82 and 110 is in turn seated on plate 130 and secured to support member 42 by clamp plate 134 and bolts 136. Support member 42 has a port 128 in its rear wall in which conduit 138 is threadedly received. At the upper end of member 42 is a port 140 in which a bushing 142 is disposed to provide a guide for the upper end of member 48.

Additional details of the valve structure that is formed by seal member 114 and recess 78 may be seen with reference to FIG. 6. Seal member 114 includes an annular resilient core member 150 and a split toroidal collar member 152 of polytetrafluoroethylene which provides a resilient, low friction seal surface against the cylindrical wall surface of shaft 76. In the position shown in FIG. 6, the valve members function to close the passageway formed by bore 126 of member 110 from bore 90 of outer member 82. When the shaft 76 is moved downwardly to the position shown in FIG. 5, the valve is opened. In this position, air under pressure supplied by a blower connected to conduit 138 is applied through manifold groove 102, radial passage 104, manifold groove 120 and passage 122 to bore 120 for flow down past recess 78 through bore 90 to the conical chamber 46 secured by O-ring 88 on the lower end of member 82 to increase the pressure in that chamber to supplement the action of plunger 76 in discharging material through the port at the tip of the conical chamber 46.

Figure 3:
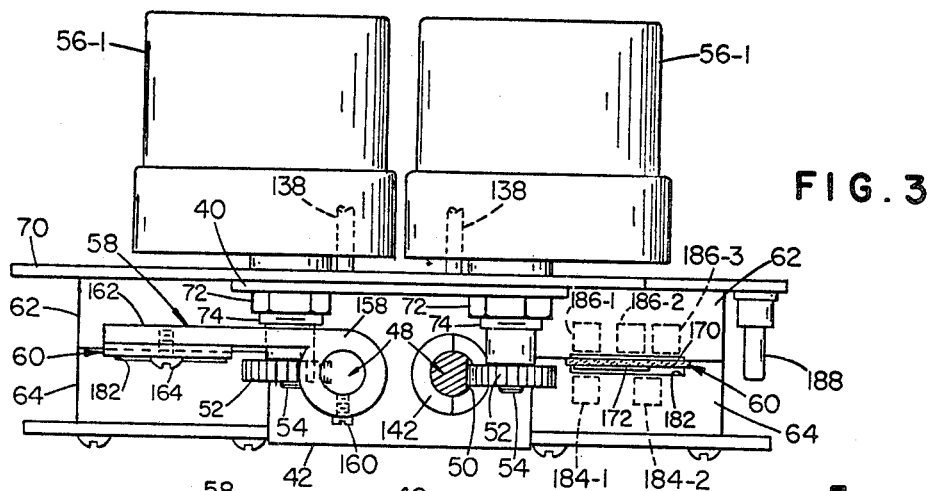
FIG. 3 is a top view, with parts broken away, of the dispensing apparatus shown in FIG. 2.
Figure 4:
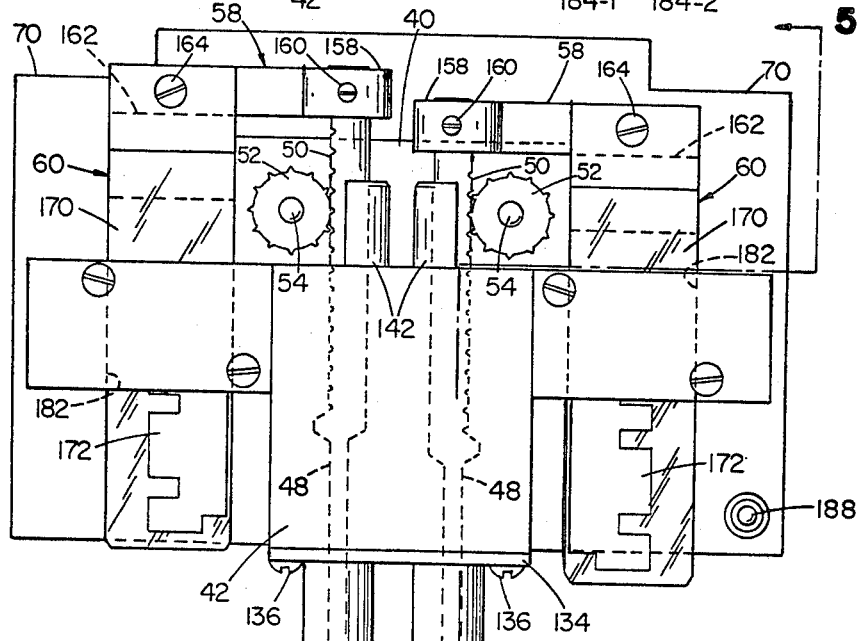
FIG. 4 is a front elevational view of the dispensing apparatus shown in FIG. 3.

The arm member 58 that is secured at the upper end of plunger member 48 (as best seen in FIG. 3) includes a head portion 188 that is disposed over the end of member 48 and is secured with set screw 160. Its laterally extending arm portion 162 has index member 60 secured to it by bolt 164. Additional details of index member 60 may be seen with reference to FIG. 7. Each index member includes a glass substrate 170 that is 2.27 inches in length and 0.75 inch in width. An opaque flag marking 172 is formed on substrate 174. The lefthand section of flag marking 172 includes a lower travel limit reference 174 and an upper travel limit reference 176. The righthand section of the flag marking 172 includes a datum or reference mark 178 and four parallel signal marks 180-1 - 180-4. Mark 180-1 is spaced 0.137 inch from datum mark 178; mark 180-2 is spaced 0.265 inch; mark 180-3 is spaced 0.521 inch; and mark 180-4 is spaced 1.032 inch from the datum mark 178 corresponding to 25, 50, 100, and 200 microliters, respectively.

Each index member 60 extends downwardly from support arm 162 and passes through the guide passage 182 between light source housing member 62 and sensor housing member 64. As will be seen with reference to FIG. 3, light source 184-1 is aligned with sensor 186-1 and arranged so that the lefthand section of the flag marking 172 is interposed between that source 184-1 and sensor 186-1. The second source 184-2 is aligned with the right vertical edge of the flag marking so that the righthand portion of the flag marking is interposed between source 184-2 and sensor 186-2 while sensor 186-3 is disposed for uninterrupted viewing of source 184-2 and functions as a reference sensor. A lamp 188 mounted on support 70 is visible through aperture 190 (FIG. 1) in the cover housing of the dispenser apparatus.

Figure 8:
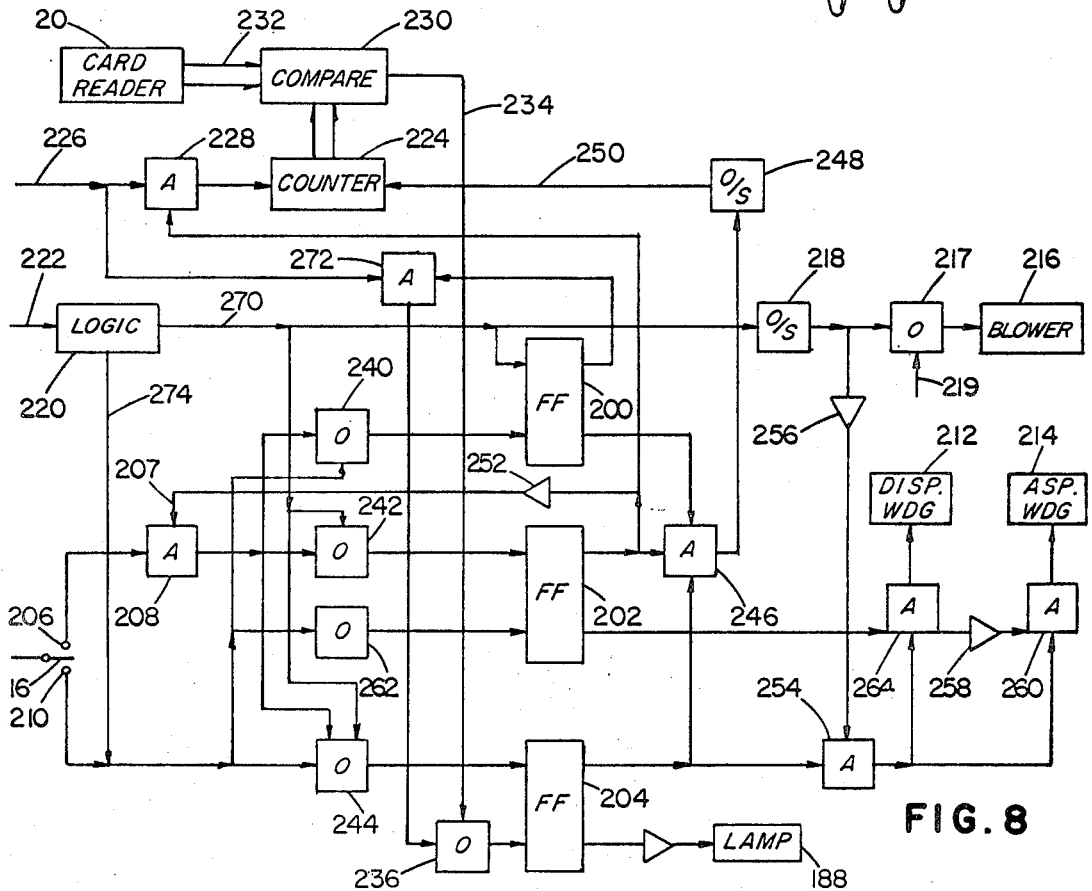
FIG. 8 is a block diagram of logic circuitry employed in the dispensing system.

A better understanding of the operation of the dispenser system may be had with reference to FIG. 8. That control logic responds to the operation of switch 16, the operation of which controls three flip flops, a flag flip flop 200, a direction control flip flop 202 and a motor power control flip flop 204. Switch 16 is a two position switch which, when moved to engage upper contact 206, generates an aspirate signal (providing that the system is not in aspirate mode as indicated by a conditioning signal on line 207 of AND circuit 208) that clears the flag flip flop 202, sets the motor direction flip flop 202 and sets the motor power flip flop 204 (this setting of flip flops 200, 202 and 204 establishes the aspirate mode). When switch 16 is moved to engage lower contact 210, a dispense signal clears flip flops 200 and 202 and sets flip flop 204 establishing system dispense mode. The outputs of flip flops 202 and 204 control the energization of dispense winding 212 of motor 56 and aspirate winding 214 of that motor. Blower motor 216 is energized in response to the output of one shot circuit 218 (through OR circuit 217 which has a second input over line 219 from the other dispenser) which in turn is triggered by a lower travel limit signal from logic 220 which responds to signals from photocell 186-1, applied over line 222. The logic also includes a counter 224 which is stepped by signals from sensing photocells 186-2 and 186-3 over line 226 when the system is in aspirate mode as indicated by conditioned AND circuit 228; and a compare circuit 230 which compares the output of counter 224 with signals from card reader 20 over line 232. The output of compare circuit 230 over line 234 clears flip flop 204 via OR circuit 236.

Placing switch 16 in the aspirate position completes a circuit to contact 206 and through OR circuit 240 clears flip flop 200 through OR circuit 242 sets flip flop 202 and through OR circuit 244 sets flip flop 204. The resulting three outputs cause AND circuit 246 to produce an output that is applied to one shot 248 and that circuit in turn produces an output of 100 milliseconds duration over line 250 to reset counter 224. The set flip flop 202 also applies conditioning level to AND circuit 228 and through inverter 252 removes a conditioning level from AND circuit 208. The output of flip flop 204 conditions AND circuit 254 and as one shot 218 is not producing an output, inverter 256 provides a second conditioning to AND circuit 254 and the resulting output causes AND circuit 260 (conditioned by the output of inverter 258) to energize the aspirate winding 214 of motor 56. The setting of motor flip flop 204 also energizes lamp 188. The energization winding 214 of motor 56 starts raising shaft 48 from the datum reference point (indicated by the edge 178 disposed between source 184-2 and sensor 186-2), and this upward movement of shaft 48 draws material from a supply through the port at the end of the sample tip 46 into the sample chamber 46. The index member 60 moves with the aspirating member 48 and that movement is sensed by the light source-photocell combination. Each transition from light to dark produces a pulse on line 226 which is passed by AND circuit 228 to step counter 224. Digital signals from card reader 20 are applied over lines 232 to compare circuit 230 and when the setting of counter 224 is the same as the card reader digital signals on lines 232, the compare circuit 230 produces an output over line 234 to clear flip flop 204 and de-energize winding 214 and lamp 188. Thus, drive motor 56 is stopped and a precise amount of material as determined by the signals from card reader 20 is stored in the chamber defined by the sample tip 46.

The supply of material is then removed from beneath tip 46, and after its frangible port 38 has been opened, the appropriate chamber 36 of the cuvette 24 to be filled is placed under the dispenser. The control switch 16 is then moved to dispense position completing electrical circuit to contact 210 which is passed through OR circuit 240 to clear flip flop 200 through OR circuit 262 to clear flip flop 202 and through OR circuit 244 to set flip flop 204. The resulting output signals are applied to condition AND circuit 264 and its output in turn energizes dispense winding 212 so that motor 56 drives shaft 48 in the dispense direction. Signals on line 226 are blocked from application to counter 224 by the removal of conditioning signal from AND circuit 228 upon the clearing of flip flop 202.

When the lower travel limit (edge 174) is reached, the signals from sensor 186-1 on line 222 and from sensors 186-2 and 186-3 on line 226 causes logic 220 to generate an output on line 270 which sets flip flops 200, 202 and 204. The signal on line 270 also triggers one shot 218 to generate an output of two seconds duration to energize blower motor 216 and apply air pressure to conduit 138. At this time, shaft 48 is in the position shown in FIG. 5, the valve defined by groove 78 and seal member 114 being opened and positive pressure is applied through the space between bore 90 and shaft 48 to chamber 46 to dispense any material remaining in that sample tip. The output of one shot circuit 116 also removed conditioning level from AND circuit 254 via inverter 256 and thus removes the conditioning signal applied to AND circuits 260 and 264 so that the shaft member 48 remains in this position while blower 216 is operating. However, the motor control circuitry is conditioned so that on termination of the output from one shot circuit 218, winding 214 is energized to move shaft member 48 upward. As the flip flop 200 is set, conditioning AND circuit 272, the first transition signal on line 226 is passed by the conditioned AND circuit 272 to clear flip flop 204 and stop motor 56 with datum reference 178 aligned with the light source-photocell sensor. Thus the dispenser has been reset to its datum or initial starting point from which the next aspirate sequence will be initiated.

If for any reason, the upper travel limit 176 should be sensed, logic 220 generates a signal on line 274 to initiate a dispense sequence automatically and discharge material from sample tip 46.

In a specific example of use of this dispenser system in a biochemical analysis for serum glucose, all three cuvette chambers 36 initially contain 4 milliliters of liquid reagent (6 percent orthotoluidiene in glacial acetic acid) when it is received by the user together with a corresponding ("Glucose") data card 30. With the data card positioned in card reader 20, the card reader has an output over lines 252 to compare circuit 212. A glucose serum standard (containing a precisely determined 200 milligrams per 100 milliliters and coordinated with the glucose data card 30) is placed beneath the sample tip 46-1 and the control 16-1 is moved to the aspirate position so that 100 microliters (mark 180-3) of the standard is placed in the sample chamber 46-1. The same amount (100 microliters) of a sample of the serum to be analyzed is similarly placed in the chamber of dispenser 14-2 through operation of control 16-2. The cuvette 24 is then positioned so that chambers 36-2 and 36-3 are aligned with dispensing chambers 46-1 and 46-2, respectively, and then both controls 16-1 and 16-2 are moved to dispense position to discharge the samples into chambers 36-2 and 36-3. Nothing is added to chamber 36-1. After the chambers have been resealed and the contents mixed by inversion, the cuvette assembly 24 is placed in a unit of the incubator 18 and incubated at 100°C for 20 minutes. When the incubation period is complete, the cuvette 24 is placed in the photometric recess 22, the photometer being set in accordance with data on the associated glucose data card 30, and a photometric analysis of the materials in the three chambers 36 is made. The output digital value displayed at display 26 is directly proportional to the concentration of glucose in the sample serum in units of milligrams per 100 milliliters.

Thus, the invention provides convenient and versatile system for accurately dispensing material. It is particularly useful in conjunction with the performance of analyses of blood and other body fluids. The system is easily operated by untrained personnel and enables analytical information to be made available, quickly, accurately and inexpensively.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. A dispenser apparatus comprising a housing, said housing including a chamber for holding a sample and said chamber having a bore therein and a port, a movable member mounted in said bore for reciprocating movement, rack and pinion gearing means to move said member relative to said chamber from a first position to a second position to aspirate material into said chamber through said port and to move said member from said second position toward said first position to dispense material from said chamber through said port, and means to increase the pressure in said chamber to supplement the dispensing action produced by the movement of said member from said second position toward said first position.

2. A dispenser apparatus comprising a housing, said housing including a chamber for holding a sample and said chamber having a port, a movable member coupled to said housing, means to move said member relative to said chamber from a first position to a second position to aspirate material into said chamber through said port and to move said member from said second position toward said first position to dispense material from said chamber through said port, and means to increase the pressure in said chamber to supplement the dispensing action produced by the movement of said member from said second position toward said first position, said means to increase pressure in said chamber including a blower and means to connect said blower to said chamber.

3. The apparatus as claimed in claim 2 wherein said member has a bypass portion and movement of said member to a third position opens said bypass portion to provide communication between said blower and said chamber.

4. A dispenser apparatus comprising a housing, said housing including a chamber for holding a sample and said chamber having a port, a movable member coupled to said housing, means to move said member relative to said chamber from a first position to a second position to aspirate material into said chamber through said port and to move said member from said second position toward said first position to dispense material from said chamber through said port, and means to increase the pressure in said chamber to supplement the dispensing action produced by the movement of said member from said second position toward said first position, said means to increase the pressure in said chamber including a source of pressure, a passage between said source of pressure and said chamber and valve means responsive to movement of said member for controlling the flow through said passage.

5. The apparatus as claimed in claim 4 wherein said valve means includes a bypass groove in said member and further including a cooperating seal member in said housing that normally engages said member in sealing relation so that, when said member is moved to a third position, said bypass groove is juxtaposed with said seal member and a path of communication is provided between said source of pressure and said chamber.

6. A dispenser apparatus comprising a housing, a replaceable member secured to the end of said housing and defining a chamber for holding a sample, said replaceable member being conical in configuration and having a port formed at the tip of said conical member, a movable member coupled to said housing, means to move said member relative to said chamber from a first position to a second position to aspirate material into said chamber through said port and to move said member from said second position toward said first position to dispense material from said chamber through said port, and means to increase the pressure in said chamber to supplement the dispensing action produced by the movement of said member from said second position toward said first position.

7. The apparatus as claimed in claim 6 wherein said housing has a bore therein, said movable member is mounted in said bore for reciprocating movement, and said means to move said member includes a reversible electric motor coupled to said movable member by rack and pinion gearing.

8. The apparatus as claimed in claim 7 wherein said means to increase pressure in said chamber includes a blower and means to connect said blower to said chamber.

9. The apparatus as claimed in claim 8 wherein said valve means includes a bypass groove in said member and further including a cooperating annular seal member in said housing that normally engages said member in sealing relation so that when said member is moved to a third position, said bypass groove is juxtaposed with said seal member and a path of communication is provided between said blower and said chamber.

* * * * *